US011555138B2

(12) United States Patent
Cliffe et al.

(10) Patent No.: US 11,555,138 B2
(45) Date of Patent: Jan. 17, 2023

(54) FLUIDS AND METHODS FOR MITIGATING SAG AND EXTENDING EMULSION STABILITY

(71) Applicant: SCHLUMBERGER TECHNOLOGY CORPORATION, Sugar Land, TX (US)

(72) Inventors: Stephen Cliffe, Stonehaven (GB); Steven Young, Cypress, TX (US); Chemsseddine Bouguetta, Houston, TX (US); Dimitri M. Khramov, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/905,053

(22) Filed: Feb. 26, 2018

(65) Prior Publication Data
US 2018/0244976 A1    Aug. 30, 2018

Related U.S. Application Data

(60) Provisional application No. 62/463,698, filed on Feb. 26, 2017.

(51) Int. Cl.
*E21B 21/00* (2006.01)
*C09K 8/36* (2006.01)
*C09K 8/035* (2006.01)

(52) U.S. Cl.
CPC ........... *C09K 8/36* (2013.01); *C09K 8/035* (2013.01); *E21B 21/00* (2013.01); *E21B 21/001* (2013.01)

(58) Field of Classification Search
CPC .......... C09K 8/035; C09K 8/36; E21B 21/00; E21B 21/001
See application file for complete search history.

(56) References Cited

U.S. PATENT DOCUMENTS

| | | | |
|---|---|---|---|
| 4,381,241 A | 4/1983 | Romenesko et al. | |
| 4,508,628 A * | 4/1985 | Walker | C09K 8/36 507/129 |
| 5,007,489 A * | 4/1991 | Enright | C09K 8/06 175/65 |
| 5,057,234 A * | 10/1991 | Bland | C09K 8/02 166/301 |
| 6,147,047 A | 11/2000 | Robbins et al. | |
| 6,387,874 B1 | 5/2002 | Schalitz et al. | |
| 7,534,743 B2 | 5/2009 | Kirsner et al. | |
| 8,476,201 B2 | 7/2013 | Miller et al. | |
| 8,476,206 B1 | 7/2013 | Malshe | |
| 8,569,213 B2 | 10/2013 | Miller et al. | |
| 9,518,206 B2 | 12/2016 | Maghrabi et al. | |
| 2004/0110642 A1 | 6/2004 | Thompson et al. | |
| 2005/0049147 A1 | 3/2005 | Patel et al. | |
| 2009/0107681 A1 * | 4/2009 | Hough | C09K 8/44 166/308.3 |
| 2009/0192052 A1 * | 7/2009 | Zhang | C09K 8/032 507/140 |
| 2010/0258313 A1 | 10/2010 | Ballard | |
| 2011/0160099 A1 * | 6/2011 | Patel | C09K 8/36 507/130 |
| 2011/0166047 A1 * | 7/2011 | Patel | C09K 8/36 507/110 |
| 2011/0180256 A1 * | 7/2011 | Tehrani | C09K 8/145 166/272.6 |
| 2011/0284228 A1 | 11/2011 | Huang et al. | |
| 2012/0067575 A1 | 3/2012 | Luyster et al. | |
| 2012/0080232 A1 | 4/2012 | Muller et al. | |
| 2013/0048281 A1 | 2/2013 | Van Zanten et al. | |
| 2013/0085086 A1 | 4/2013 | Harris | |
| 2013/0137611 A1 | 5/2013 | Pierce et al. | |
| 2013/0331303 A1 * | 12/2013 | Rife | C09K 8/36 507/131 |
| 2014/0090897 A1 | 4/2014 | Lee et al. | |
| 2014/0349908 A1 | 11/2014 | Delaney et al. | |
| 2014/0357533 A1 * | 12/2014 | Wells | C09K 8/20 507/126 |
| 2018/0155610 A1 | 6/2018 | Goual et al. | |
| 2018/0244975 A1 | 8/2018 | Khramov et al. | |

(Continued)

FOREIGN PATENT DOCUMENTS

| | | |
|---|---|---|
| CN | 103555304 A | 2/2014 |
| EP | 2258803 A2 | 12/2010 |

(Continued)

OTHER PUBLICATIONS

Spectrum Chemical MFG Corp, TERGITOL(R) TMN-g, Surfactant, retrieved May 25, 2021 from https://www.spectrumchemical.com/OA_HTML/chemical-products_TergitolR-TMN-6-Surfactant_T1303.jsp (Year: 2021).*
NEODOL 25-3, Technical Data Sheet, retrieved Sep. 21, 2021 from file:///C:/Users/aditrani/Documents/e-Red%20Folder/15905053/neodol-25-3-tds-nov-2020.pdf (Year: NA) (Year: NA).*
Spectra Base, SILWET L-77, retrieved Sep. 21, 2021 from https://spectrabase.com/spectrum/7WhO7HcgEuf (Year: NA) (Year: NA).*
PCT International Search Report and Written Opinion dated Jun. 21, 2018, by the Korean Intellectual Property Office in corresponding International Application No. PCT/US2018/019759 (10 pages).
PCT International Search Report and Written Opinion dated Jun. 21, 2018, by the Korean Intellectual Property Office in corresponding International Application No. PCT/US2018/019758 (10 pages).

(Continued)

*Primary Examiner* — Angela M DiTrani Leff

(57) ABSTRACT

A method of drilling a wellbore includes pumping an oleaginous wellbore fluid into a wellbore, the oleaginous wellbore fluid including an oleaginous continuous phase; a non-oleaginous discontinuous phase; an emulsifier stabilizing the non-oleaginous discontinuous phase in the oleaginous continuous phase; an organophilic clay; a weighting agent; and a wetting agent having an HLB ranging from about 4 to 10.5 that it selected such that the oleaginous wellbore fluid has a 600 rpm dial value at 40° F. of less than about 300 and a 10 minute gel strength of less than about 40 lbf/100 ft$^2$.

6 Claims, No Drawings

(56) References Cited

U.S. PATENT DOCUMENTS

| | | | |
|---|---|---|---|
| 2018/0362833 A1 | 12/2018 | Jackson et al. | |
| 2019/0382641 A1 | 12/2019 | Cliffe et al. | |
| 2020/0231860 A1 | 7/2020 | Khramov et al. | |

FOREIGN PATENT DOCUMENTS

| | | | |
|---|---|---|---|
| GB | 2309240 | A | 7/1997 |
| RU | 2458958 | C1 | 8/2012 |
| RU | 2492207 | C1 | 9/2013 |
| WO | 0041480 | A2 | 7/2000 |
| WO | 02053676 | A1 | 7/2002 |
| WO | 2012003325 | A1 | 1/2012 |
| WO | 2013-095934 | A2 | 6/2013 |
| WO | 2016/010518 | A1 | 1/2016 |
| WO | 2016-137922 | A1 | 9/2016 |
| WO | 2019028198 | A1 | 2/2019 |
| WO | 2020097489 | A1 | 5/2020 |

OTHER PUBLICATIONS

International Preliminary Report on Patentability (IPRP) and Written Opinion dated Sep. 6, 2019, in corresponding International Application No. PCT/US2018/019759 (9 pages).
International Preliminary Report on Patentability (IPRP) and Written Opinion dated Sep. 6, 2019, in corresponding International Application No. PCT/US2018/019758 (9 pages).
International Preliminary Report on Patentability for the cross referenced patent application PCT/US2018/019759 dated Aug. 27, 2019.
International Preliminary Report on Patentability for the equivalent International patent application PCT/US2018/019758 dated Aug. 27, 2019.
Office Action received in U.S. Appl. No. 16/487,830 dated Oct. 9, 2020, 8 pages.
Office Action issued in U.S. Appl. No. 16/487,830 dated Mar. 23, 2021, 8 pages.
Technical Data Sheet of TERGITOL 15-S-3 of The Dow Chemical Company, 2021.
Office Action issued in U.S. Appl. No. 15/904,897 dated Mar. 24, 2021, 9 pages.
Extended European Search Report and Opinion issued in EP Patent Application No. 18758013.9 dated Dec. 7, 2020, 6 pages.
International Search Report and Written Opinion issued in International Patent application PCT/US2019/060513 dated Apr. 9, 2020, 13 pages.
International Preliminary Report on Patentability issued in International Patent application PCT/US2019/060513 dated May 20, 2021, 10 pages.
Office Action issued in U.S. Appl. No. 15/904,897 dated Jul. 26, 2021, 12 pages.
Search Report and Office Action issued in Russian Patent Application No. 2019130054 dated Jul. 5, 2021, 10 pages with English translation.
Office Action issued in U.S. Appl. No. 17/291,627 dated Mar. 31, 2022, 14 pages.
1st Exam Report issued in Saudi Arabian Patent Application No. 519402534 dated Mar. 18, 2022, 9 pages with English translation.
Office Action issued in U.S. Appl. No. 16/556,798 dated Apr. 11, 2022, 9 pages.
Exam Report issued in United Kingdom Patent Application No. GB1912094.8 dated Sep. 1, 2021, 4 pages.
Decision on Grant issued in Russian Patent Application dated Dec. 8, 2021, 16 pages.
Office Action issued in U.S. Appl. No. 15/605,053 dated Oct. 13, 2021, 7 pages.
Exam Report issued in United Kingdom Patent Application No. GB1912094.8 dated Feb. 18, 2022, 4 pages.
Search Report under Section 17(8) issued in United Kingdom Patent Application No. GB1912094.8 dated May 13, 2022, 2 pages.
Preliminary Office Action issued in Brazil Patent Application No. BR112019017731-0 dated Apr. 29, 2022, 6 pages with English translation.
Office Action issued in U.S. Appl. No. 17/291,627 dated Sep. 19, 2022, 11 pages.

\* cited by examiner

FLUIDS AND METHODS FOR MITIGATING SAG AND EXTENDING EMULSION STABILITY

CROSS-REFERENCE TO RELATED APPLICATIONS

This Application claims priority to U.S. Provisional Patent Application No. 62/463,698 filed on Feb. 26, 2017, which is incorporated herein by reference.

BACKGROUND

During the drilling of a wellbore, various fluids are typically used in the well for a variety of functions. The fluids may be circulated through a drill pipe and drill bit into the wellbore, and then may subsequently flow upward through the wellbore to the surface. During this circulation, the drilling fluid may act to remove drill cuttings from the bottom of the hole up to the surface, to suspend cuttings and weighting material when circulation is interrupted, to control subsurface pressures, to maintain the integrity of the wellbore until the well section is cased and cemented, to isolate the fluids from the subterranean formation by providing sufficient hydrostatic pressure to prevent the ingress of formation fluids into the wellbore, to cool and lubricate the drill string and bit, and/or to maximize penetration rate when drilling.

In most rotary drilling procedures, the drilling fluid takes the form of a "mud," i.e., a liquid having solids suspended therein. The solids function to impart desired rheological properties to the drilling fluid and also to increase the density thereof in order to provide a suitable hydrostatic pressure at the bottom of the well. The drilling mud may be either a water-based or an oil-based mud. As such, the ability to suspend drilling cuttings to reduce wear on the drill bit depends on the rheological properties of the drilling mud related to the viscosity of the drilling fluid.

Drilling muds may consist of polymers, biopolymers, clays and organic colloids added to a water-based fluid to obtain the desired viscous and filtration properties. Heavy minerals, such as barite or calcium carbonate, may be added to increase density. Solids from the formation are incorporated into the mud and often become dispersed in the mud as a consequence of drilling. Further, drilling muds may contain one or more natural and/or synthetic polymeric additives, including polymeric additives that increase the rheological properties (e.g., plastic viscosity, yield point value, gel strength) of the drilling mud, and polymeric thinners and flocculants.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of drilling a wellbore, that includes pumping an oleaginous wellbore fluid into a wellbore, the oleaginous wellbore fluid including an oleaginous continuous phase; a non-oleaginous discontinuous phase; an emulsifier stabilizing the non-oleaginous discontinuous phase in the oleaginous continuous phase; an organophilic clay; a weighting agent; and a wetting agent having an HLB ranging from about 4 to 10.5 that it selected such that the oleaginous wellbore fluid has a 600 rpm dial value at 40° F. of less than about 300 and a 10 minute gel strength of less than about 40 lbf/100 ft².

In another aspect, embodiments disclosed herein relate to an oleaginous wellbore fluid that includes an oleaginous continuous phase; a non-oleaginous discontinuous phase; an emulsifier stabilizing the non-oleaginous discontinuous phase in the oleaginous continuous phase; an organophilic clay; at least one wetting agent selected from alcohol ethoxylates, amine ethoxylates, or ethylene oxide/propylene oxide copolymers; and a weighting agent; wherein the wellbore fluid has a 600 rpm dial value at 40° F. of less than about 300.

In yet another aspect, embodiments disclosed herein relate to an oleaginous wellbore fluid that includes an oleaginous continuous phase; a non-oleaginous discontinuous phase; an emulsifier to stabilize the non-oleaginous discontinuous phase in the oleaginous continuous phase; an organophilic clay; an alcohol ethoxylate depicted by Formula I:

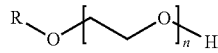

Formula I wherein R is one of an oleyl group, a stearyl group, a tridecyl group, or a lauryl group, and n is between 2 and 5; and a weighting agent; wherein the wellbore fluid has a 600 rpm dial value at 40° F. of less than about 300.

Other aspects and advantages of the claimed subject matter will be apparent from the following description and the appended claims.

DETAILED DESCRIPTION

Embodiments disclosed herein relate generally to wellbore fluids that exhibit reduced sag and extended emulsion stability. More specifically, embodiments disclosed herein relate to wellbore fluids that include organophilic clays and have reduced sag at low temperature (~40° F.). Sag is defined as the settling of particles in the annulus of a well. Sag can occur when the wellbore fluid is static or being circulated. Because of the combination of secondary flow and gravitational forces, weighting materials can settle (i.e., sag) in a flowing mud in a high-angle well. If settling is prolonged, the upper part of a wellbore will lose mud density, which lessens the hydrostatic pressure in the hole, so an influx (a kick) of formation fluid can enter the well which may damage the well or lead to the loss of the well. In some instances, operators attempt to increase the viscosity of a fluid to reduce sag. However, this approach can be problematic because the increasing pressures necessary to pump a more viscous fluid can lead to a greater risk for lost circulation when the pumping pressure exceeds that which the formation can withstand. This elevated viscosity is particularly problematic at lower temperatures where the fluid may naturally become more viscous.

In some embodiments, wellbore fluids disclosed herein may be an oil-based wellbore fluid, such as an invert emulsion containing an aqueous discontinuous phase and an oil-based continuous phase, "Invert emulsion," as used herein, is an emulsion in which a non-oleaginous fluid is the discontinuous phase and an oleaginous fluid is the continuous phase.

"Oleaginous liquid," as used herein, means an oil which is a liquid at 25° C. and is immiscible with water. Oleaginous liquids may include substances such as hydrocarbons used in the formulation of drilling fluids such as diesel oil, mineral oil, synthetic oil (including linear alpha olefins and internal olefins, polydiorganosiloxanes, siloxanes or organosiloxanes), ester oils, glycerides of fatty acids, aliphatic esters, aliphatic ethers, aliphatic acetals, or other such hydrocarbons and combinations of these fluids. The concentration of the oleaginous fluid should be sufficient so that an invert emulsion forms. The concentration of the oleaginous fluid may be less than about 99% by volume of the invert emulsion. In one embodiment the amount of oleaginous fluid is from about 30% to about 95% by volume and more particularly about 40% to about 90% by volume of the invert emulsion fluid.

"Non-oleaginous liquid," as used herein, means any substance that is a liquid at 25° C. and that is not an oleaginous liquid as defined above. Non-oleaginous liquids are immiscible with oleaginous liquids but capable of forming emulsions therewith. Non-oleaginous liquids may include aqueous substances such as fresh water, sea water, brine containing inorganic or organic dissolved salts, aqueous solutions containing water-miscible organic compounds and mixtures of these. The amount of the non-oleaginous fluid is typically less than the theoretical maximum limit for forming an invert emulsion. Thus, the amount of non-oleaginous fluid is less than about 70% by volume. Preferably, the amount of non-oleaginous fluid ranges from about 1% to about 70% by volume, and more preferably from about 5% to about 60% by volume of the invert emulsion fluid.

Suitable oil-based or oleaginous fluids for use in wellbore fluids of the present disclosure may be a natural or a synthetic oil. In one or more embodiments the oleaginous fluid may be selected from the group including diesel oil; mineral oil; a synthetic oil, such as hydrogenated and unhydrogenated olefins including polyalpha olefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof.

Non-oleaginous liquids may, in some embodiments, include at least one of fresh water, sea water, brine, mixtures of water and water-soluble organic compounds, and mixtures thereof. In various embodiments, the non-oleaginous fluid may be a brine, which may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

In one or more embodiments, the oil-based wellbore fluid of the present disclosure may also contain an emulsifier, organophilic clays, a wetting agent, and a weighting agent. These components will be described in greater detail below. Prior to describing the specific components in detail, it should be understood that an oil-based wellbore fluid described herein and including the components listed above may be formulated such that it has certain rheological properties that lead to reduced sag and in particular reduced low temperature sag. For example, a wellbore fluid according to the present disclosure may have rheological properties including a 600 rpm dial value at 40° F. of less than about 300 or less than about 275, or less than about 250. Thus, at low temperatures (such as the temperature at which a fluid is pumped and exposed to high shear), the viscosity is not too high. Generally, a fluid having too high of high end rheology could be modified to have acceptable values at high shear, but such modifications would likely render the fluid unsuitable at low shear (with too low viscosity), particularly at higher temperatures when a fluid would naturally be less viscous. However, advantageously, the present inventors have found a wellbore fluid according to the present disclosure may also have rheological properties including a 6 rpm dial value at 150° F. of between about 6 and 15. Thus, the fluid of the present disclosure may have both acceptable high end rheology at low temperatures and low end rheology at high temperatures, meeting both ends of the spectrum to avoid sag.

Gel strength (i.e., measure of the suspending characteristics or thixotropic properties of a fluid) was evaluated by the 10 minute gel strength in pounds per 100 square feet, in accordance with procedures in API Bulletin RP 1313-2, 1990. In one or more embodiments, a wellbore fluid according to the present disclosure may have rheological properties including a 10 minute gel strength value at 40° F. of less than 40 lbf/100 ft$^2$ or less than 35 lbf/100 ft$^2$. Thus, as described above, the fluids of the present disclosure may have advantageous rheological properties at a low temperature (40° F.) without sacrificing rheological properties at higher temperatures.

In fact, one or more embodiments of the present disclosure may be directed to a wellbore fluid having a flat rheology profile. As used herein, "flat rheology profile" means that consistent rheological properties are maintained over temperature ranges from 40° F. to 150° F. The rheological properties of focus for a flat rheology profile include 6 rpm, 10 minute gel (10'), Yield Point (YP), and 10 minute-to-10 second gel ratio (10':10" gel ratio). With respect to 6 rpm, 10' gel, and YP, a system is considered to have a flat rheology profile when these values are within +/−20% of the mean values across temperature ranges from 40° F. to 150° F. Lower percent variation will yield a more flat rheology profile, so values within +/−15% may be present in some embodiments, and +/−10% is even more particular embodiments. With respect to 10':10" gel ratio, a system is considered to have a flat rheology profile when the ratio is 1.5:1 or less.

To mitigate sag of the weighting agent within the oleaginous fluid, without creating a rheological profile that is problematic at colder temperatures when the viscosity of the fluid will naturally increase (particularly as the base fluid interacts with the weighting agent particles present in the fluid), the present inventors have determined that addition of particular wetting agents to the fluid may result in a weighted fluid that avoids sag without having excessive viscosity, particularly at colder temperatures. For example, in one or more embodiments, the wetting agent has a hydrophilic-lipophilic-balance (HLB) value of between about 4 to 10.5, or from about 5 to 9, or from about 6 to 8. HLB values are empirical expressions for the relationship of the amount of hydrophilic and hydrophobic groups on a wetting agent. In general, the higher the HLB value, the more water-soluble a wetting agent will be. Further, and as will be demonstrated in the Examples below, after long term exposure to elevated temperatures a fluid of the present disclosure having a wetting agent with a HLB value higher than about 10.5 may become degraded and destabilized, presumably due to decomposition of the wetting agent. In one or more embodiments, the wetting agent may be present in the wellbore fluid in an amount of about 2 to 6 pounds per barrel (ppb) or 2.25 to 5 ppb. The inventors theorize that the wetting agent may preferentially wet the weighting agent particles present in the fluid so as to reduce sag of the particles within the fluid.

Thus, in one or more embodiments, the fluid may have minimal sag after a 7 day static period at elevated temperatures such as at least 200° F., 225° F., 250° F., 300° F., or 325° F. When fluid sags, the fluid exhibits a density change over the fluid column. Thus, by having minimal sag, the fluid may have less than a 1.25 or 1.0 ppg change over the static period. Another way of expressing this is through a "sag factor", which is calculated for a fluid heat aged in a static cell for a period of time of at least 16 hours, by dividing the bottom density by the sum of the top and bottom densities. A sag factor of 0.5 indicates no settlement of weighting agents. In one or more embodiments of the present disclosure, a sag factor of less than 0.54 may be achieved or less than 0.53, 0.52, or 0.51.

In one or more embodiments, the wetting agent may be at least one selected from alcohol alkoxylates, amine alkoxylates, or ethylene oxide/propylene oxide copolymers. An alcohol ethoxylate according to the present disclosure may be generally depicted by Formula I below.

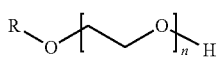

Formula I whereas an alcohol propoxylate would substitute a propylene oxide tor the ethylene oxide used in an alcohol ethoxylate. It is also envisioned that a combination of ethoxylation and propoxylation may be used. In Formula I, R may be a C10-28 alkyl group (either linear or branched, saturated or unsaturated) and n may range between 2 and 6 (or 3 and 5 in some embodiments). Further, it is also envisioned that R and n are not limited to such ranges, but may be selected such that the resulting HLB is within the ranges described herein. In particular embodiments, R may be an oleyl group, a stearyl group, a tridecyl group, or a lauryl group. For example, in one or more embodiments, the wetting agent may be at least one alcohol ethoxylate selected from group of oleyl alcohol-2-ethyoxylate, oleyl alcohol-3-ethyoxylate, oleyl alcohol-5-ethyoxylate, stearyl alcohol-2-ethyoxylate, stearyl alcohol-3-ethyoxylate, lauryl alcohol-4-ethyoxylate, and tridecyl alcohol-3-ethyoxylate.

In one or more embodiments, the alcohol ethoxylate of the present disclosure may be depicted by Formula II below. Formula II represents a secondary alcohol ethoxylate.

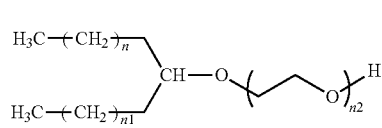

Formula II

In one or more embodiments, n+n1=12 and n2=2-4. In one or more embodiments, the secondary alcohol ethoxylate of Formula III has an n2 value of 2.

In one or more embodiments, the wetting agent may be at least one amine ethoxylate or amine propoxylate. Amine ethoxylates may have the general formula:

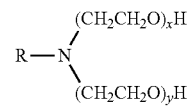

where R may be a C10-C26 alkyl group (either linear or branched, saturated or unsaturated), and x+y ranges from 2 to 15, or from 2 to 10 in more particular embodiments. One of ordinary skill in the art would appreciate that an amine propoxylate substitutes propoxylate groups for the shown ethoxylate groups in the above formula. In one or more embodiments, the amine ethoxylate may be selected from PEG-2 oleylamine, PEG-2 coco amine, PPG 2 cocoamine, PEG 15 cocoamine, PEG 5 tallow diamine, PEG-2 tallow amine, and PEG-5 tallow amine.

In one or more embodiments, the wetting agent may be at least one ethylene oxide/propylene oxide copolymer that is selected from a poly(ethylene glycol)-block-poly(propylene glycol)-block-poly(ethylene glycol) or ethylene diamine ethylene oxide/propoylene oxide copolymer. The poly(ethylene glycol)-block-poly(propylene glycol)-block-poly(ethylene glycol) may have a Mn between about 1000 and 5000. The ethylene diamine ethylene oxide/propoylene oxide copolymer may be, for example, ethylenediamine tetrakis (propoxylate-block-ethoxylate) tetrol, or an ethylenediamine tetrakis(ethoxylate-block-propoxylate) tetrol. Such ethylene diamine ethylene oxide/propoylene oxide copolymers may have an Mn ranging, for example from 3000 to 10000.

Other wetting agents may include alkyl sulfonates, amine ethers (including primary amine ethers such as ROCH$_2$CH$_2$CH$_2$NH$_2$ and ether diamines such as ROCH$_2$CH$_2$CH$_2$NHCH$_2$CH$_2$CH$_2$NH$_2$, where R may be selected from C6 to C18 and may be linear or branched, saturated or unsaturated), amide ethoxylates, a polyester condensation polymer (produced, for example, from condensation reaction of a hydroxy-fatty acid), a polyamine condensation polymer, a fatty polycarboxylic acid, polyether siloxanes, or aluminum salts of fatty acids.

One of the components of wellbore fluids of the present disclosure is an emulsifier that stabilizes the internal aqueous (non-oleaginous) phase within the external oleaginous fluid to form an invert emulsion. Such emulsifiers may comprise paraffins, fatty-acids, amine-based components, amidoamines, polyolefin amides, soaps of fatty acids, polyamides, polyamines, polyolefin amides, polyolefin amide alkeneamines, alkoxylated ether acids (such as an alkoxylated fatty alcohol terminated with a carboxylic acid), oleate esters, such as sorbitan monoleate, sorbitan dioleate, imidazoline derivatives or alcohol derivatives and combinations or derivatives of the above or the like. Blends of these materials as well as other emulsifiers can be used for this application. Examples of such emulsifiers, such as a high internal phase emulsifier, may be SUREMUL PLUS™ available from MI-SWACO (Houston, Tex.). In particular embodiments, an invert emulsion fluid of the present disclosure may be stabilized by an emulsifier formed from a fatty acid (one or more of a C10-C24 fatty acid, for example, which may include linear and/or branched, and saturated and/or unsaturated fatty acids) reacted with one or more ethyleneamines (e.g., ethylenediamine, diethylenetriamine, triethylenetetraamine, tetraethylenepentaamine) to produce one or more of amides, polyamides, and/or amidoamines, depending, for example, on the mole ratio of the polyamine to the fatty acid. In one or more embodiments, the emulsifier may be a dimer poly-carboxylic C12 to C22 fatty acid, trimer poly-carboxylic C12 to C22 fatty acid, tetramer poly-carboxylic C12 to C22 fatty acid, mixtures of these acids, or a polyamide wherein the polyamide is the condensation reaction product of a C12-C22 fatty acid and a polyamine selected from the group consisting of diethylenetriamine, triethylenetetramine; and tetraethylenepentamine.

While many flat rheology fluids avoid organophilic clays, one or more embodiments of the present disclosure achieves the flat rheology profile desired while incorporating at least one organophilic clay into the invert emulsion fluid. An organophilic clay is defined to mean a clay that is treated in any way to have an organophilic coating or surface treatment. In particular embodiments, the organophilic clay may be an organophilic sepiolite.

In one or more embodiments, untreated clays, including untreated attapulgite clay and untreated sepiolite clay may also be used as viscosifiers in addition to the organophilic clays. Other viscosifiers and gellants, such as oil soluble polymers, styrene-butadiene block polymers, polyamide resins, polycarboxylic acids and soaps may also be used in addition to the organophilic clays. The total amount of viscosifier used in the compositions may vary depending on downhole conditions, as understood by those skilled in the art. However, normally a total amount of about 0.1% to 8% by weight range may be sufficient for most applications.

Weighting agents or density materials suitable for use in wellbore fluid formulations in accordance with the present disclosure include, but are not limited to, hematite, magnetite, iron oxides, illmenite, barite, siderite, celestite, dolomite, calcite, manganese oxides, halites and the like. In one or more embodiments, the weighting agents may be coated with a dispersant.

The quantity of the coated or uncoated weighting agent added, if any, may depend upon the desired density of the final composition. Weighting agents may be added to result in a final fluid density of up to about 22 pounds per gallon (ppg). In other embodiments, the weighting agent may be added to achieve a final fluid density of up to 20 ppg or up to 19.5 ppg. In one or more embodiments, weighting agents may be added to result in a final fluid density of at least about 10 ppg.

In one or more embodiments, the wellbore fluids of the present disclosure may also include at least one particle selected from calcium carbonate or hallyosite. Hallyosite is an aluminosilicate clay that has a tubular morphology. In one or more embodiments, calcium carbonate or hallyosite may be included in the wellbore fluids of the present disclosure in amounts between about 5 and 30 ppb or amounts from 8 to 25 ppb.

Optionally, a rheology modifier may be included in the fluid of the present disclosure to reduce the increase in viscosity, i.e. flatten the rheological characteristics, of the drilling fluid over a temperature range from about 40° F. to about 150° F. The rheology modifier may be polyamides, polyamines, amidoamines, polyetheramines, or mixtures thereof. Polyamides may be derived from reacting a polyamine with the reaction product of an alcoholamine and a fatty acid, for example. Generally, the alcoholamine-fatty acid reaction is based on a one equivalent of fatty acid for each equivalent of alcoholamine present. This reaction product is then reacted on a 1:1 equivalent ratio with the polyamine, and then quenched with a propylenecarbonate to remove any free unreacted amines. With respect to the rheology modifier, alcoholamines of the present disclosure may be selected from the group consisting of monoethanolamine, diethanolamine, triethanolamine, and mixtures thereof. Fatty acids may include tall oil or other similar unsaturated long chain carboxylic acids having from about 12 to about 22 carbon atoms. The fatty acids may be dimer or trimer fatty acids, or combinations thereof. As previously mentioned, once the alcoholamine has been reacted with the fatty acid, the reaction product is then further reacted with a polyamine. With respect to the rheology modifier, polyamines may be selected from the group consisting of diethylene triamine, triethylene tetramine, tetraethylene pentamine, and combinations thereof. Commercially available rheology modifiers that provide flat rheology wellbore fluids include EMI-1005, available from M-I SWACO (Houston, Tex.), and TECHWAX™ LS-10509 and LS-20509, both available from International Specialty Products (Wayne, N.J.).

It is conventional in many invert emulsions to include an alkali reserve so that the overall fluid formulation is basic (i.e. pH greater than 7). Typically, this is in the form of lime or alternatively mixtures of alkali and alkaline earth oxides and hydroxides. One of skill in the art should understand and appreciate that the lime content of a well bore fluid will vary depending upon the operations being undertaken and the formations being drilled. Further it should be appreciated that the lime content, also known as alkalinity or alkaline reserve, is a property that is typically measured in accordance with the applicable API standards which utilize methods that should be well known to one of skill in the art of fluid formulation.

Fluid loss control agents typically act by coating the walls of the borehole as the well is being drilled. Suitable fluid loss control agents which may find utility in this invention include modified lignites, asphaltic compounds, gilsonite, organophilic humates prepared by reacting humic acid with amides or polyalkylene polyamines, and other non-toxic fluid loss additives. Typically, fluid loss control agents are added in amounts less than about 10% and preferably less than about 5% by weight of the fluid.

The method used in preparing wellbore fluids described herein is not critical. For example, conventional methods can be used to prepare the wellbore fluids in a manner analogous to those normally used, to prepare conventional oil-based drilling fluids. In one representative procedure, a desired quantity of oleaginous fluid such as a base oil and a suitable amount of the remaining components are added sequentially with continuous mixing. An invert emulsion of the present disclosure is formed by vigorously agitating, mixing or shearing the oleaginous fluid with a non-oleaginous fluid.

The disclosed wellbore fluids are especially useful in the drilling, completion and working over of subterranean oil and gas wells. In particular, the fluids are useful in formulating drilling fluids and completion fluids for use in high deviation wells, and long reach wells. Such fluids are especially useful in the drilling of horizontal wells into hydrocarbon bearing formations. Thus, the present fluids may be pumped into a wellbore and circulated therethrough.

EXAMPLES

In the first example a 14.96 pound per gallon (ppg) seed mud was formulated using the RHELIANT drilling fluid system, available from M-I LLC, Houston Tex. Two samples of this seed mud were treated with a 50/50 dilution as shown in Table 1.

TABLE 1

| Treatment (g) | Ex. 1 | Ex. 2 |
|---|---|---|
| 14.96 ppg seed mud | 471.4 | 471.4 |
| IO 1618 | 46.6 | 46.6 |
| EMI-3203 | 5.0 | 5.0 |
| Alcohol Ethoxylate 1 | 4.0 | — |
| Alcohol Ethoxylate 2 | — | 4.0 |
| SURETROL | 0.50 | 0.50 |
| DURAMOD | 8.0 | 8.0 |
| LDP 2026 | 1.00 | 1.00 |
| MICROBAR | 51.0 | 51.0 |

In this set of examples Alcohol Ethoxylate 1 had an HLB value of 6.6 and was according to Formula I above with an oleyl group as the R group and an n value of 3. Alcohol Ethoxylate 2 had an HLB value of 4.9 and was according to Formula I above with a stearyl group as the R group and an n value of 2.

The rheology of the initial seed mud and the muds of Example 1 and Example 2 are shown in Table 2 below.

While there was no appreciable reduction in 7 day sag factor measured at 325° F. with the treatment above, a significant reduction in sag was seen at lower temperature (210-250° F.) in later data for Example 1.

In another set of examples, a 15.03 ppg seed mud (EMS 4720 fluid available from M-I SWACO Houston, Tex.) was treated as shown in Table 3 and Table 4.

TABLE 3

| Example 3 | | |
|---|---|---|
| 15.03 ppg Seed Mud | g | 315.8 |
| IO 1618 | g | 64.4 |
| EMI-3203 | g | 10.0 |
| Alcohol Ethoxylate 1 | g | 4.0 |
| LIME | g | 3.0 |
| CaCl2 Brine (25%) | g | 32.7 |
| SURETROL (EMI-2487) | g | 1.0 |
| DURAMOD | g | 8.0 |
| RHEFLAT | g | 1.0 |
| EMI-1776 | g | 181.6 |

TABLE 4

| Example 4 | | |
|---|---|---|
| 15.03 ppg Seed Mud | g | 315.8 |
| IO 1618 | g | 58.7 |
| EMI-3203 | g | 10.0 |
| Alcohol Ethoxylate 1 | g | 4.00 |
| LIME | g | 3.00 |
| CaCl2 Brine (25%) | g | 30.3 |
| SURETROL (EMI-2487) | g | 1.00 |
| DURAMOD | g | 8.0 |
| RHEFLAT | g | 1.0 |
| EMI-1776 | g | 169.8 |
| API EVAL CLAY | g | 20.0 |

The rheology of the initial seed mud and the muds of Example 3 and Example 4 are shown in Table 5 below.

TABLE 2

| | 14.96 RHELIANT SEED MUD | | | | | Example 1 | | | | | Example 2 | | | | |
|---|---|---|---|---|---|---|---|---|---|---|---|---|---|---|---|
| | Heat Aging Temp | | | | | | | | | | | | | | |
| | 325° F. | | | | | 325° F. | | | | | 325° F. | | | | |
| | Heat Aging Time | | | | | | | | | | | | | | |
| | 160 hr | | | | | 160 hr | | | | | 160 hr | | | | |
| | Aging Condition | | | | | | | | | | | | | | |
| | INITIAL | | Static | | | INITIAL | | Static | | | INITIAL | | Static | | |
| Rheology Temp, ° F. | 40 | 150 | 40 | 100 | 150 | 40 | 150 | 40 | 100 | 150 | 40 | 150 | 40 | 100 | 150 |
| R600, ° VG | 270 | 77 | 337 | 147 | 98 | 225 | 86 | 217 | 104 | 72 | 348 | 89 | 346 | 106 | 79 |
| R300, ° VG | 147 | 44 | 172 | 87 | 60 | 124 | 56 | 119 | 60 | 45 | 180 | 56 | 175 | 62 | 46 |
| R200, ° VG | 104 | 33 | 126 | 65 | 46 | 88 | 44 | 84 | 44 | 35 | 132 | 44 | 126 | 46 | 39 |
| R100, ° VG | 58 | 21 | 73 | 42 | 32 | 52 | 31 | 49 | 28 | 24 | 81 | 30 | 72 | 28 | 27 |
| R6, ° VG | 12 | 6 | 16 | 16 | 15 | 11 | 12 | 8 | 8 | 11 | 21 | 12 | 13 | 8 | 13 |
| R3, ° VG | 10 | 5 | 14 | 15 | 14 | 9 | 11 | 6 | 6 | 11 | 18 | 11 | 11 | 7 | 13 |
| PV, cP | 123 | 33 | 14 | 60 | 38 | 101 | 30 | 98 | 44 | 27 | 168 | 33 | 171 | 44 | 33 |
| YP, lb/100 ft$^2$ | 24 | 11 | 165 | 27 | 22 | 23 | 26 | 21 | 16 | 18 | 12 | 23 | 4 | 18 | 13 |
| LSYP, lb/100 ft$^2$ | 8 | 4 | 12 | 14 | 13 | 7 | 10 | 4 | 4 | 11 | 15 | 10 | 9 | 6 | 13 |
| 10-sec Gel, lb/100 ft$^2$ | 13 | 9 | 37 | | 27 | 16 | 17 | 7 | 14 | 24 | 47 | 20 | 27 | 15 | 24 |
| 10-min Gel, lb/100 ft$^2$ | 32 | 17 | 48 | | 30 | 35 | 30 | 12 | 26 | 29 | 66 | 32 | 55 | 33 | 33 |
| E.S. @150° F., V | 559 | | | | | 593 | | 1123 | | | 1005 | | 1164 | | 983 |
| 7 day Sag, ΔMW, ppg (325 F.) | | | | | 2.50 | | | | | 2.88 | | | | | 2.69 |

TABLE 5

| | 15.03 ppg EMS 4720 Total LGS = 2.9% | | | | | Example 3 Total LGS = 1.4% | | | | | Example 4 Total LGS = 3.6% | | | | |
|---|---|---|---|---|---|---|---|---|---|---|---|---|---|---|---|
| Heat Aging Temp. | | | | | | | | | | | | | | | |
| | 210° F. | | | | | 210° F. | | | | | 210° F. | | | | |
| Heat Aging Time | | | | | | | | | | | | | | | |
| | 160 | | | | | 160 | | | | | 160 | | | | |
| Aging Condition | | | | | | | | | | | | | | | |
| | INITIAL | | S | | | INITIAL | | Static | | | INITIAL | | Static | | |
| Rheology Temp, °F. | 40 | 150 | 40 | 100 | 150 | 40 | 150 | 40 | 100 | 150 | 40 | 150 | 40 | 100 | 150 |
| R600, °VG | 225 | 65 | 230 | 96 | 59 | 261 | 92 | 250 | 122 | 84 | 355 | 129 | 335 | 168 | 115 |
| R300, °VG | 122 | 38 | 125 | 53 | 33 | 143 | 56 | 137 | 70 | 49 | 197 | 81 | 191 | 97 | 70 |
| R200, °VG | 86 | 29 | 88 | 37 | 24 | 102 | 43 | 97 | 51 | 37 | 141 | 63 | 137 | 72 | 54 |
| R100, °VG | 48 | 19 | 49 | 21 | 15 | 58 | 29 | 54 | 31 | 23 | 84 | 44 | 80 | 46 | 36 |
| R6, °VG | 10 | 8 | 10 | 6 | 5 | 13 | 14 | 10 | 8 | 7 | 41 | 23 | 17 | 15 | 14 |
| R3, °VG | 8 | 7 | 8 | 5 | 4 | 11 | 13 | 7 | 7 | 6 | 38 | 22 | 13 | 13 | 12 |
| PV, cP | 103 | 27 | 105 | 43 | 26 | 118 | 36 | 113 | 52 | 35 | 158 | 48 | 159 | 71 | 45 |
| YP, lb/100 ft$^2$ | 19 | 11 | 20 | 10 | 7 | 25 | 20 | 24 | 18 | 14 | 39 | 33 | 32 | 26 | 25 |
| LSYP, lb/100 ft$^2$ | 6 | 6 | 6 | 4 | 3 | 9 | 12 | 4 | 6 | 5 | 35 | 21 | 9 | 11 | 10 |
| 10-sec Gel, lb/100 ft$^2$ | 10 | 12 | 9 | 7 | 7 | 15 | 28 | 11 | 11 | 12 | 28 | 52 | 18 | 20 | 23 |
| 10-min Gel, lb/100 ft$^2$ | 28 | 25 | 21 | 15 | 15 | 36 | 45 | 21 | 21 | 23 | 68 | 117 | 37 | 36 | 36 |
| E.S. @150° F., V | | 328 | | | | | 428 | | 1080 | | | 613 | | 1419 | 918 |
| 7 day Sag, ΔMW, ppg (210° F.) | | | 3.06 | | | | | 1.21 | | | | | 0.81 | | |

In another example, a 15 pound per gallon (ppg) seed mud was formulated using the RHELIANT drilling fluid system, available from M-I LLC, Houston Tex. The seed mud was treated as shown in Table 6 below to create a 14 ppg fluid of Example 5.

TABLE 6

| Example 5 | | |
|---|---|---|
| 15.00 ppg seed mud | g | 315.0 |
| IO 1618 | g | 74.4 |
| EMI-3203 | g | 10.0 |
| Alcohol Ethoxylate 1 | g | 4.00 |

TABLE 6-continued

| Example 5 | | |
|---|---|---|
| LIME | g | 3.00 |
| CaCl2 Brine (25%) | g | 32.50 |
| SURETROL (EMI-2487) | g | 1.00 |
| DURAMOD | g | 8.0 |
| DRAGONITE XR | g | 20.0 |
| LDP 2026 (RHEOLOGY MODIFIER) | g | 1.0 |
| MICROBAR | g | 146.6 |

The rheology of the initial seed mud and the mud of Example 5 is shown in Table 7 below.

TABLE 7

| | 15.00 ppg Seed Mud | | | | | 14.00 ppg Example 5 | | | | | | | | | | | | | | | | | |
|---|---|---|---|---|---|---|---|---|---|---|---|---|---|---|---|---|---|---|---|---|---|---|---|
| Heat Aging Temp., °F. | | | | | | | | | | | | | | | | | | | | | | | |
| | | | 325 | | | | | 210 | | | 250 | | | 280 | | | 300 | | | 325 | | |
| Heat Aging, hr | | | | | | | | | | | | | | | | | | | | | | | |
| | | | 160 | | | | | 160 | | | 160 | | | 160 | | | 160 | | | 160 | | |
| Static/Rolling | | | | | | | | | | | | | | | | | | | | | | | |
| | INITIAL | | | S | | INITIAL | | | S | | S | | | S | | | S | | | S | | |
| Rheology Temp, °F. | 40 | 150 | 40 | 100 | 150 | 40 | 150 | 40 | 100 | 150 | 40 | 100 | 150 | 40 | 100 | 150 | 40 | 100 | 150 | 40 | 100 | 150 |
| R600, °VG | 270 | 77 | 350 | 147 | 98 | 360 | 118 | 265 | 139 | 105 | 246 | 144 | 108 | 250 | 132 | 97 | 260 | 138 | 106 | 243 | 157 | 115 |
| R300, °VG | 147 | 44 | 172 | 87 | 60 | 188 | 77 | 152 | 83 | 67 | 142 | 88 | 70 | 142 | 82 | 64 | 144 | 84 | 70 | 143 | 97 | 77 |
| R200, °VG | 104 | 33 | 126 | 65 | 46 | 136 | 61 | 110 | 63 | 52 | 104 | 67 | 57 | 13 | 63 | 52 | 103 | 65 | 57 | 107 | 76 | 63 |
| R100, °VG | 58 | 21 | 73 | 42 | 32 | 82 | 43 | 63 | 41 | 36 | 61 | 46 | 41 | 62 | 43 | 38 | 60 | 43 | 42 | 67 | 52 | 48 |
| R6, °VG | 12 | 6 | 16 | 16 | 15 | 22 | 19 | 13 | 15 | 16 | 15 | 18 | 22 | 16 | 18 | 20 | 12 | 17 | 24 | 19 | 25 | 32 |
| R3, °VG | 10 | 5 | 14 | 15 | 14 | 19 | 18 | 12 | 14 | 14 | 13 | 17 | 20 | 14 | 16 | 18 | 10 | 16 | 23 | 17 | 23 | 30 |
| PV, cP | 123 | 33 | 178 | 60 | 38 | 172 | 41 | 113 | 56 | 38 | 104 | 56 | 38 | 108 | 50 | 33 | 116 | 54 | 36 | 100 | 60 | 38 |
| YP, lb/100 ft$^2$ | 24 | 11 | −6 | 27 | 22 | 16 | 36 | 39 | 27 | 29 | 38 | 32 | 32 | 34 | 32 | 31 | 28 | 30 | 34 | 43 | 37 | 39 |
| LSYP, lb/100 ft$^2$ | 8 | 4 | 12 | 14 | 13 | 16 | 17 | 11 | 13 | 12 | 11 | 16 | 18 | 12 | 14 | 16 | 8 | 15 | 22 | 15 | 21 | 28 |
| 10-sec Gel, lb/100 ft$^2$ | 13 | 9 | 37 | | | 27 | 25 | 27 | 18 | 23 | 22 | 22 | 31 | 33 | 21 | 28 | 28 | 16 | 30 | 33 | 29 | 39 | 39 |
| 10-min Gel, lb/100 ft$^2$ | 32 | 17 | 48 | | | 30 | 57 | 41 | 43 | 43 | 35 | 47 | 43 | 37 | 38 | 39 | 36 | 31 | 41 | 34 | 50 | 45 | 40 |
| E.S. @150° F., V | | 559 | | | | | 1128 | | | | 1047 | | | 1090 | | | 1092 | | | 603 | | | 621 |
| 7 day Sag, ΔMW, ppg | | | 2.50 | | | | | 0.74 | | | 1.15 | | | 1.34 | | | 1.79 | | | N/D (gelled) | | |

In another set of examples, two muds were formulated as shown in Table 8 below, where Example 6 was formulated as a Comparative Sample equivalent to U.S. Pat. No. 8,476,206.

TABLE 8

| Treatment (g) | | Ex. 6 | Ex. 7 |
|---|---|---|---|
| IO 1618 | bbl | 0.519 | 0.5235 |
| EMI-3203 | lb/bbl | — | 16 |
| Alcohol Ethoxylate 1 | lb/bbl | — | 4 |
| SUREMUL | lb/bbl | 16 | — |
| SURETROL | lb/bbl | — | 1 |
| DURAMOD | lb/bbl | 4 | 8.0 |
| Lime | lb/bbl | 4 | 4 |
| MICROBAR | lb/bbl | — | 330.23 |
| Water | bbl | 0.152 | 0.1451 |
| CaCl$_2$ | lb/bbl | 19.04 | 18.13 |
| ECOTROL RD | lb/bbl | 2 | — |
| SAFECARB 2 | lb/bbl | 10 | 10 |
| PANGEL B-5 | lb/bbl | — | 0.5 |
| M-I GEL SUPREME | lb/bbl | 4 | — |
| RHEFLAT | lb/bbl | — | 1 |
| SUREMOD | lb/bbl | 1 | — |
| M-I WATE | lb/bbl | 333 | — |

The rheology of the muds of Examples 6 and Example 7 are shown in Table 9 below.

TABLE 9

| | Example 6 14.15 ppg | | | | | | | Exemple 7 14.11 ppg | | | | | |
|---|---|---|---|---|---|---|---|---|---|---|---|---|---|
| | INITIAL | | | 200° F. 62 Static | | | INITIAL | | | 210° F. 72 Static | | | |
| Rheology Temp, ° F. | 40 | 100 | 150 | 40 | 100 | 150 | 40 | 100 | 150 | 40 | 100 | 150 |
| R600, °VG | | | | TTTM | 76 | 55 | 242 | 107 | 73 | 208 | 94 | 63 |
| R300, °VG | | | | 242 | 43 | 32 | 134 | 61 | 43 | 114 | 52 | 37 |
| R200, °VG | | | | 175 | 33 | 24 | 94 | 44 | 33 | 81 | 38 | 28 |
| R100, °VG | | | | 105 | 22 | 16 | 52 | 27 | 21 | 44 | 22 | 18 |
| R6, °VG | | | | 30 | 8 | 6 | 8 | 7 | 8 | 7 | 6 | 6 |
| R3, °VG | | | | 23 | 7 | 5 | 6 | 6 | 7 | 5 | 4 | 5 |
| PV, cP | | | | TTTM | 33 | 23 | 108 | 46 | 30 | 94 | 42 | 26 |
| YP, lb/100 ft$^2$ | | | | TTTM | 10 | 9 | 26 | 15 | 13 | 20 | 10 | 11 |
| LSYP, lb/100 ft$^2$ | | | | 16 | 6 | 4 | 4 | 5 | 6 | 3 | 2 | 4 |
| 10-sec Gel, lb/100 ft$^2$ | | | | 50 | 9 | 6 | 8 | 9 | 14 | 5 | 7 | 7 |
| 10-min Gel, lb/100 ft$^2$ | | | | 51 | 19 | 22 | 16 | 21 | 43 | 12 | 15 | 21 |
| E.S. @120° F., V | | | | 659 | | | 1013 | | | 580 | | |
| ΔMW on bottom, lbm/gal | | | | 0.56-0.62 | | | | | | 0.34-0.69 | | |
| HTHP @ 250° F., mL | | | | 2.0 | | | | | | 3.2 | | |
| Water in HTHP Filtrate, mL | | | | 0 | | | | | | 0 | | |

TTTM—Too Turbulent to Measure

In another example, a 11.25 pound per gallon (ppg) seed mud was treated as shown in Table 10 below to create 14.5 ppg fluids of Example 8 and Example 9. In Example 9, the combination of an Alcohol Ethoxylate 3 according to Formula I above with an HLB of about 5 and an oleyl group as the R group and an n value of 2 and an Alcohol Ethoxylate 4 according to Formula I above with an HLB of about 9 and an oleyl group as the R group and an n value of 5. This combination has a calculated HLB value of about the same value for Alcohol Ethoxylate 1 alone.

TABLE 10

| | Example 8 (g) | Example 9 (g) |
|---|---|---|
| EMS4720, Sevan LA, 11.25 ppg | 2400 | 240.0 |

TABLE 10-continued

| | Example 8 (g) | Example 9 (g) |
|---|---|---|
| IO 1618 | 50.0 | 50.0 |
| Sursmul, amine #20 | 10.0 | 10.0 |
| Surewet | 0.0 | 0.0 |
| Alcohol Ethoxylate 3 | 0.0 | 2.0 |
| Alcohol Ethoxylate 1 | 4.0 | 0.0 |
| Alcohol Ethoxylate 4 | 0.0 | 2.0 |
| LIME | 0.0 | 0.0 |
| 25% CaCl2 Brine | 12.0 | 12.0 |
| ECOTROL HT | 3.0 | 3.0 |
| ONE TROL HT | 0.0 | 0.0 |
| DURAMOD | 4.0 | 4.0 |
| RHEFLAT | 0.0 | 0.0 |
| EMI-1776 | 250.0 | 250.0 |
| API EVAL CLAY | 25.0 | 25.0 |

The rheology of the mud of Example 8 are shown in Table 11 below.

TABLE 11

| | Heat Aging Temp., ° F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 14.50 | | | 14.50 | | | 14.50 | | |
| Rheology Temp, ° F. | 40 | 100 | 150 | 40 | 100 | 150 | 40 | 100 | 150 |
| R600, °VG | 278 | | 88 | 286 | 141 | 96 | 280 | 141 | 98 |
| R300, °VG | 152 | | 53 | 160 | 83 | 59 | 156 | 83 | 61 |
| R200, °VG | 110 | | 40 | 115 | 61 | 46 | 112 | 62 | 47 |
| R100, °VG | 64 | | 26 | 67 | 39 | 31 | 65 | 40 | 32 |
| R6, °VG | 12 | | 8 | 13 | 13 | 12 | 13 | 13 | 13 |
| R3, °VG | 10 | | 7 | 11 | 11 | 12 | 11 | 12 | 12 |
| PV, cP | 126 | 0 | 35 | 126 | 58 | 37 | 124 | 58 | 37 |
| YP, lb/100 ft² | 26 | 0 | 18 | 34 | 25 | 22 | 32 | 25 | 24 |
| LSYP, lb/100 ft² | 8 | 0 | 6 | 9 | 9 | 12 | 9 | 11 | 11 |
| 10-sec Gel, lb/100 ft² | 12 | | 9 | 14 | 14 | 16 | 14 | 15 | 16 |
| 10-min Gel, lb/100 ft² | 22 | | 20 | 31 | 30 | 33 | 28 | 32 | 27 |
| Static Shear, lb/100 ft² | | | | | | | | | |
| E.S. @150° F., V | | 1065 | | | 1008 | | | 1019 | |
| HTHP Temp, ° F. | | | | | 325 | | | 325 | |
| HTHP FL, ml | | | | | 7.4 | | | 8.6 | |
| Water in HTHP Filtrate, ml | | | | | 0 | | | 0 | |

The rheology of the mud of Example 9 are shown in Table 12 below.

TABLE 12

| | Heat Aging Temp., ° F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | D | | | S | | |
| | | | | Mud Weight, lb/gal | | | | | |
| | 14.50 | | | 14.50 | | | 14.50 | | |
| Rheology Temp, ° F. | 40 | 100 | 150 | 40 | 100 | 150 | 40 | 100 | 150 |
| R600, °VG | 288 | | 90 | 281 | 132 | 92 | 300+ | 155 | 101 |
| R300, °VG | 160 | | 53 | 153 | 79 | 57 | 180 | 93 | 64 |
| R200, °VG | 115 | | 40 | 110 | 60 | 44 | 127 | 70 | 50 |
| R100, °VG | 65 | | 25 | 63 | 38 | 31 | 74 | 45 | 35 |
| R6, °VG | 14 | | 8 | 13 | 12 | 13 | 15 | 15 | 15 |
| R3, °VG | 11 | | 7 | 11 | 11 | 11 | 13 | 14 | 14 |
| PV, cP | 128 | 0 | 37 | 128 | 53 | 35 | ##### | 62 | 37 |
| YP, lb/100 ft² | 32 | 0 | 16 | 25 | 26 | 22 | ##### | 31 | 27 |
| LSYP, lb/100 ft² | 8 | 0 | 6 | 9 | 10 | 9 | 11 | 13 | 13 |
| 10-sec Gel, lb/100 ft² | 13 | | 9 | 15 | 15 | 16 | 15 | 18 | 17 |
| 10-min Gel, lb/100 ft² | 23 | | 16 | 25 | 26 | 29 | 25 | 25 | 23 |
| Static Shear, lb/100 ft² | | | | | | | | | |
| E.S. @150° F., V | | | | | 1030 | | | 880 | |
| HTHP Temp, ° F. | | | | | 325 | | | 325 | |
| HTHP FL, ml | | | | | 8.5 | | | 12.6 | |
| Water in HTHP Filtrate, ml | | | | | 0 | | | 0 | |

Example 10 is a fluid with the same composition as that for Example 8 (shown in Table 10 above), with the exception being that 4 ppb of a secondary alcohol ethoxylate according to Formula II, where n+n1=12 and 2=2 was used instead of Alcohol Ethoxylate 1. This secondary alcohol ethoxylate has an HLB of about 8. The rheology of the mud of Example 3 is shown in Table 13 below.

TABLE 13

| | Heat Aging Temp., ° F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 14.50 | | | 14.50 | | | 14.50 | | |
| Rheology Temp, ° F. | 40 | 100 | 150 | 40 | 100 | 150 | 40 | 100 | 150 |
| R600, °VG | 300 | | 98 | >300 | 152 | 104 | >300 | 158 | 111 |
| R300, °VG | 171 | | 61 | 172 | 91 | 65 | 185 | 96 | 71 |
| R200, °VG | 123 | | 47 | 124 | 69 | 51 | 133 | 73 | 56 |
| R100, °VG | 74 | | 32 | 73 | 45 | 35 | 79 | 49 | 40 |
| R6, °VG | 18 | | 12 | 18 | 17 | 17 | 20 | 20 | 20 |
| R3, °VG | 15 | | 10 | 15 | 16 | 16 | 17 | 18 | 18 |
| PV, cP | 129 | 0 | 37 | ##### | 61 | 39 | ##### | 62 | 40 |
| YP, lb/100 ft$^2$ | 42 | 0 | 24 | ##### | 30 | 26 | ##### | 34 | 31 |
| LSYP, lb/100 ft$^2$ | 12 | 0 | 8 | 12 | 15 | 15 | 14 | 16 | 16 |
| 10-sec Gel, lb/100 ft$^2$ | 18 | | 14 | 22 | 25 | 23 | 25 | 28 | 26 |
| 10-min Gel, lb/100 ft$^2$ | 37 | | 27 | 47 | 39 | 31 | 48 | 42 | 33 |
| Static Shear, lb/100 ft$^2$ | | | | | | | | | |
| E.S. @150° F., V | | | 1080 | | | 886 | | | 903 |
| HTHP Temp, ° F. | | | | | | 325 | | | 325 |
| HTHP FL, ml | | | | | | 12.4 | | | 11.6 |
| Water in HTHP Filtrate, ml | | | | | | 0 | | | 0 |

Comparative Example 1 is a fluid with the same composition as that for Example 8 (shown in Table 10 above), with the exception being that 4 ppb of a secondary alcohol ethoxylate according to Formula II, where n+n1=12 and n2=6 was used instead of Alcohol Ethoxylate 1. This secondary alcohol ethoxylate has an HLB value of about 12 and an n2 value outside of the range discussed above for being appropriate for a wetting agent. The rheology of the mud of Comparative Example 1 is shown in Table 14 below.

TABLE 14

| | Heat Aging Temp., ° F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 14.50 | | | 14.50 | | | 14.50 | | |
| Rheology Temp, ° F. | 40 | 100 | 150 | 40 | 100 | 150 | 40 | 100 | 150 |
| R600, °VG | 300 | | 89 | >300 | 154 | 107 | >300 | 218 | 165 |
| R300, °VG | 172 | | 54 | 172 | 93 | 66 | 287 | 131 | 108 |
| R200, °VG | 130 | | 41 | 121 | 71 | 52 | 211 | 99 | 85 |
| R100, °VG | 78 | | 27 | 68 | 45 | 35 | 129 | 65 | 60 |
| R6, °VG | 20 | | 9 | 12 | 17 | 15 | 34 | 24 | 29 |
| R3, °VG | 16 | | 8 | 9 | 15 | 14 | 30 | 22 | 27 |
| PV, cP | 128 | 0 | 35 | ##### | 61 | 41 | ##### | 87 | 57 |
| YP, lb/100 ft$^2$ | 44 | 0 | 19 | ##### | 32 | 25 | ##### | 44 | 51 |
| LSYP, lb/100 ft$^2$ | 12 | 0 | 7 | 6 | 13 | 13 | 26 | 20 | 25 |

TABLE 14-continued

| | Heat Aging Temp., °F. | | | | | | | |
|---|---|---|---|---|---|---|---|---|
| | INITIAL | 325 | | | | 325 | | |
| | | Heat Aging, hr | | | | | | |
| | | 16 | | | | 160 | | |
| | | Static/Rolling | | | | | | |
| | | Dynamic | | | | Static | | |
| | | Mud Weight, lb/gal | | | | | | |
| | 14.50 | 14.50 | | | | 14.50 | | |
| 10-sec Gel, lb/100 ft² | 20 | 10 | 10 | 20 | 19 | 44 | 28 | 29 |
| 10-min Gel, lb/100 ft² | 39 | 19 | 18 | 32 | 28 | 75 | 37 | 39 |
| Static Shear, lb/100 ft² | | | | | | | | |
| E.S. @150° F., V | | 514 | | | 537 | | 692 | |
| HTHP Temp, °F. | | | | | 325 | | 325 | |
| HTHP FL, ml | | | | | 10 | | 16.6 | |
| Water in HTHP Filtrate, ml | | | | | 0 | | 0 | |

Comparative Example 2 is a fluid with the same composition as that for Example 8 (shown in Table 10 above), with the exception being that 4 ppb of a secondary alcohol ethoxylate according to Formula II, where n+n1=12 and n2=8 was used instead of Alcohol Ethoxylate 1. This secondary alcohol ethoxylate has an HLB value of about 13 and an n2 value outside of the range discussed above for being appropriate for a wetting agent. The rheology of the mud of Comparative Example 2 is shown in Table 15 below.

TABLE 15

| | Heat Aging Temp., °F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 14.50 | | | 14.50 | | | 14.50 | | |
| Rheology Temp, °F. | 40 | 100 | 150 | 40 | 100 | 150 | 40 | 100 | 150 |
| R600, °VG | 300+ | | 95 | 300+ | 155 | 110 | 300+ | 175 | 139 |
| R300, °VG | 180 | | 60 | 210 | 92 | 70 | 235 | 105 | 92 |
| R200, °VG | 132 | | 45 | 154 | 70 | 54 | 177 | 79 | 74 |
| R100, °VG | 79 | | 30 | 90 | 45 | 37 | 110 | 52 | 54 |
| R6, °VG | 20 | | 10 | 20 | 16 | 16 | 35 | 20 | 29 |
| R3, °VG | 18 | | 10 | 15 | 15 | 16 | 32 | 17 | 26 |
| PV, cP | ##### | 0 | 35 | ##### | 63 | 40 | ##### | 70 | 47 |
| YP, lb/100 ft² | ##### | 0 | 25 | ##### | 29 | 30 | ##### | 35 | 45 |
| LSYP, lb/100 ft² | 16 | 0 | 10 | 10 | 14 | 16 | 29 | 14 | 23 |
| 10-sec Gel, lb/100 ft² | 24 | | 14 | 27 | 21 | 24 | 50 | 25 | 32 |
| 10-min Gel, lb/100 ft² | 38 | | 24 | 50 | 37 | 30 | 85 | 37 | 39 |
| Static Shear, lb/100 ft² | | | | | | | | | |
| E.S. @150° F., V | | | | | 350 | | | 370 | |
| HTHP Temp, °F. | | | | | 325 | | | 325 | |
| HTHP FL, ml | | | | | 10 | | | 14 | |
| Water in HTHP Filtrate, ml | | | | | 0 | | | 0 | |

Comparative Example 3 is a fluid with the same composition as that for Example 1 (shown in Table 10 above), with the exception being that 4 ppb of tristyrylphenol with 14 ethoxylate groups was used instead of Alcohol Ethoxylate 1. This compound has an HLB value of about 13. The rheology of the mud of Comparative Example 3 is shown in Table 16 below.

TABLE 16

| | Heat Aging Temp., °F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | Mud Weight, lb/gal | | | | | | | | |
| | 14.50 | | | 14.50 | | | 14.50 | | |
| Rheology Temp, °F. | 40 | 100 | 150 | 40 | 100 | 150 | 40 | 100 | 150 |
| R600, °VG | 300+ | | 130 | 300+ | 179 | 138 | 300+ | 220 | 155 |
| R300, °VG | 200 | | 80 | 199 | 110 | 91 | 225 | 137 | 109 |
| R200, °VG | 150 | | 60 | 146 | 89 | 75 | 167 | 109 | 90 |
| R100, °VG | 92 | | 40 | 90 | 60 | 54 | 105 | 75 | 71 |
| R6, °VG | 20 | | 16 | 24 | 25 | 32 | 31 | 35 | 48 |
| R3, °VG | 16 | | 15 | 22 | 24 | 32 | 30 | 34 | 47 |
| PV, cP | ##### | 0 | 50 | ##### | 69 | 47 | ##### | 83 | 46 |
| YP, lb/100 ft$^2$ | ##### | 0 | 30 | ##### | 41 | 44 | ##### | 54 | 63 |
| LSYP, lb/100 ft$^2$ | 12 | 0 | 14 | 20 | 23 | 32 | 29 | 33 | 46 |
| 10-sec Gel, lb/100 ft$^2$ | 17 | | 24 | 24 | 40 | 41 | 41 | 45 | 48 |
| 10-min Gel, lb/100 ft$^2$ | 46 | | 38 | 38 | 53 | 44 | 85 | 62 | 52 |
| Static Shear, lb/100 ft$^2$ | | | | | | | | | |
| E.S. @150° F., V | | | | | 850 | | | 900 | |
| HTHP Temp, °F. | | | | | 325 | | | 325 | |
| HTHP FL, ml | | | | | 16 | | | 19 | |
| Water in HTHP Filtrate, ml | | | | | 0.1 | | | 0.2 | |

Example 11

Evaluation of Amount of Additive Needed

Table 17 below shows a wellbore fluid formulation used to test the amount of non-ionic additive composition needed to achieve desirable low temperature rheology and high temperature stability.

TABLE 17

| VG-HT | 0.20 |
|---|---|
| IO 1618 | 144.0 |

TABLE 17-continued

| Heated Suremul | 12.0 |
|---|---|
| Alcohol Ethoxylate 1 | variable |
| LIME | 6.0 |
| 25% CaCl2 Brine | 65.0 |
| Pexatrol 932 | 3.0 |
| ONE TROL HT | 0.0 |
| DURAMOD | 6.0 |
| Rheflat | 2.0 |
| EMI-1776 | 325.0 |
| API EVAL CLAY | 25.0 |

The rheology of the mud of Example 11 when no Alcohol Ethoxylate 1 has been added is shown in Table 18 below.

TABLE 18

| | Heat Aging Temp., °F. | | | | | | | | |
|---|---|---|---|---|---|---|---|---|---|
| | INITIAL | | | 325 | | | 325 | | |
| | | | | Heat Aging, hr | | | | | |
| | | | | 16 | | | 160 | | |
| | | | | Static/Rolling | | | | | |
| | | | | Dynamic | | | Static | | |
| | Mud Weight, lb/gal | | | | | | | | |
| | 13.97 | | | 13.97 | | | 13.97 | | |
| Rheology Temp, °F. | 40 | 100 | 150 | 40 | 100 | 150 | 40 | 100 | 150 |
| R600, °VG | 300+ | | 66 | 300+ | 111 | 69 | 262 | 95 | 63 |
| R300, °VG | 177 | | 42 | 187 | 63 | 40 | 143 | 53 | 38 |
| R200, °VG | 127 | | 34 | 130 | 45 | 30 | 99 | 39 | 29 |
| R100, °VG | 75 | | 24 | 73 | 29 | 20 | 55 | 24 | 19 |
| R6, °VG | 19 | | 10 | 20 | 9 | 8 | 12 | 9 | 10 |
| R3, °VG | 19 | | 9 | 19 | 8 | 7 | 12 | 9 | 10 |
| PV, cP | ##### | 0 | 24 | ##### | 48 | 29 | 119 | 42 | 25 |
| YP, lb/100 ft$^2$ | ##### | 0 | 18 | ##### | 15 | 11 | 24 | 11 | 13 |
| LSYP, lb/100 ft$^2$ | 19 | 0 | 8 | 18 | 7 | 6 | 12 | 9 | 10 |
| 10-sec Gel, lb/100 ft$^2$ | 22 | | 15 | 28 | 14 | 16 | 17 | 20 | 19 |
| 10-min Gel, lb/100 ft$^2$ | 73 | | 28 | 48 | 28 | 24 | 40 | 29 | 26 |
| Static Shear, lb/100 ft$^2$ | | | | | | | | | |

TABLE 18-continued

| | Heat Aging Temp., ° F. | |
|---|---|---|
| INITIAL | 325 | 325 |
| | Heat Aging, hr | |
| | 16 | 160 |
| | Static/Rolling | |
| | Dynamic | Static |
| | Mud Weight, lb/gal | |
| 13.97 | 13.97 | 13.97 |
| E.S. @150° F., V | 700 | 1020 |
| HTHP Temp, ° F. | 325 | 325 |
| HTHP FL, ml | 9.6 | 13.4 |
| Water in HTHP Filtrate, ml | 0 | 0 |
| Sag value, ΔMW, ppg | | 2.83 |
| Free oil, mL | | 86 |

The rheology of the mud of Example 11 when 0.9 ppb Alcohol Ethoxylate 1 has been added is shown in Table 19 below.

TABLE 139

| | Heat Aging Temp., ° F. | | | | | | | | |
|---|---|---|---|---|---|---|---|---|---|
| | INITIAL | | | 325 | | | 3.25 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 13.97 | | | 13.97 | | | 13.97 | | |
| Rheology Temp, ° F. | 40 | 100 | 150 | 40 | 100 | 150 | 40 | 100 | 150 |
| R600, °VG | 300+ | | 59 | 298 | 104 | 67 | 251 | 99 | 67 |
| R300, °VG | 167 | | 35 | 164 | 56 | 39 | 136 | 55 | 39 |
| R200, °VG | 119 | | 26 | 115 | 40 | 29 | 95 | 39 | 29 |
| R100, °VG | 67 | | 17 | 64 | 24 | 17 | 51 | 24 | 19 |
| R6, °VG | 17 | | 7 | 15 | 6 | 6 | 10 | 7 | 9 |
| R3, °VG | 16 | | 6 | 13 | 5 | 6 | 9 | 7 | 8 |
| PV, cP | ##### | | 0 | 24 | 134 | 48 | 28 | 115 | 44 | 28 |
| YP, lb/100 ft² | ##### | | 0 | 11 | 30 | 8 | 11 | 21 | 11 | 11 |
| LSYP, lb/100 ft² | 15 | | 0 | 5 | 11 | 4 | 6 | 8 | 7 | 7 |
| 10-sec Gel, lb/100 ft² | 17 | | 10 | 19 | 10 | 15 | 13 | 17 | 20 |
| 10-min Gel, lb/100 ft² | 61 | | 28 | 40 | 28 | 24 | 34 | 20 | 28 |
| Static Shear, lb/100 ft² | | | | | | | | | |
| E.S. @150° F., V | | | | 670 | | | 650 | | |
| HTHP Temp, ° F. | | | | 325 | | | 325 | | |
| HTHP FL, ml | | | | 8.8 | | | 17 | | |
| Water in HTHP Filtrate, ml | | | | 0 | | | 0.4 | | |
| Sag value, ΔMW, ppg | | | | | | | 2.83 | | |
| Free oil, mL | | | | | | | 82 | | |

The rheology of the mud of Example 11 when 1.8 ppb Alcohol Ethoxylate 1 has been added is shown in Table 20 below.

TABLE 20

| | Heat Aging Temp., ° F. | | | | | | | | |
|---|---|---|---|---|---|---|---|---|---|
| | INITIAL | | | 325 | | | 3.25 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 13.97 | | | 13.97 | | | 13.97 | | |
| Rheology Temp, ° F. | 40 | 100 | 150 | 40 | 100 | 150 | 40 | 100 | 150 |
| R600, °VG | 285 | | 61 | 284 | 106 | 69 | 251 | 99 | 67 |
| R300, °VG | 157 | | 35 | 154 | 58 | 39 | 136 | 56 | 39 |
| R200, °VG | 112 | | 27 | 107 | 41 | 30 | 96 | 40 | 29 |
| R100, °VG | 63 | | 17 | 58 | 24 | 19 | 52 | 25 | 20 |
| R6, °VG | 12 | | 7 | 9 | 6 | 7 | 10 | 8 | 10 |
| R3, °VG | 11 | | 7 | 9 | 6 | 7 | 9 | 8 | 10 |
| PV, cP | 128 | | 0 | 26 | 130 | 48 | 30 | 115 | 43 | 28 |
| YP, lb/100 ft² | 29 | | 0 | 9 | 24 | 10 | 9 | 21 | 13 | 11 |
| LSYP, lb/100 ft² | 10 | | 0 | 7 | 9 | 6 | 7 | 8 | 8 | 10 |
| 10-sec Gel, lb/100 ft² | 15 | | 12 | 11 | 10 | 14 | 13 | 17 | 24 |
| 10-min Gel, lb/100 ft² | 45 | | 30 | 25 | 29 | 28 | 28 | 30 | 29 |
| Static Shear, lb/100 ft² | | | | | | | | | |
| E.S. @150° F., V | | | | 610 | | | 620 | | |
| HTHP Temp, ° F. | | | | 325 | | | 325 | | |
| HTHP FL, ml | | | | 9 | | | 17 | | |
| Water in HTHP Filtrate, ml | | | | 0 | | | 0.6 | | |
| Sag value, ΔMW, ppg | | | | | | | 2.53 | | |
| Free oil, mL | | | | | | | 73 | | |

The rheology of the mud of Example 11 when 2.8 ppb Alcohol Ethoxylate 1 has been added is shown in Table 21 below.

TABLE 141

| | Heat Aging Temp., ° F. | | | | | | | | |
|---|---|---|---|---|---|---|---|---|---|
| | INITIAL | | | 325 | | | 3.25 | | |
| | | | | Heat Aging, hr | | | | | |
| | | | | 16 | | | 160 | | |
| | | | | Static/Rolling | | | | | |
| | | | | Dynamic | | | Static | | |
| | | | | Mud Weight, lb/gal | | | | | |
| | 13.97 | | | 13.97 | | | 13.97 | | |
| Rheology Temp, ° F. | 40 | 100 | 150 | 40 | 100 | 150 | 40 | 100 | 150 |
| R600, °VG | 235 | | 60 | 265 | 102 | 71 | 232 | 110 | 77 |

TABLE 141-continued

| | Heat Aging Temp., ° F. | | |
|---|---|---|---|
| | INITIAL | 325 | 3.25 |
| | | Heat Aging, hr | |
| | | 16 | 160 |
| | | Static/Rolling | |
| | | Dynamic | Static |
| | | Mud Weight, lb/gal | |
| | 13.97 | 13.97 | 13.97 |

| | | | | | | | | |
|---|---|---|---|---|---|---|---|---|
| R300, °VG | 124 | 34 | 142 | 55 | 40 | 127 | 60 | 45 |
| R200, °VG | 85 | 25 | 98 | 39 | 29 | 87 | 43 | 34 |
| R100, °VG | 46 | 15 | 53 | 22 | 17 | 48 | 26 | 23 |
| R6, °VG | 6 | 5 | 8 | 5 | 7 | 8 | 9 | 12 |
| R3, °VG | 4 | 5 | 6 | 5 | 7 | 7 | 8 | 11 |
| PV, cP | 111 | 0 | 26 | 123 | 47 | 31 | 105 | 50 | 32 |
| YP, lb/100 ft² | 13 | 0 | 8 | 19 | 8 | 9 | 22 | 10 | 13 |
| LSYP, lb/100 ft² | 2 | 0 | 5 | 4 | 5 | 7 | 6 | 7 | 10 |
| 10-sec Gel, lb/100 ft² | 7 | 12 | 8 | 8 | 12 | 10 | 19 | 24 |
| 10-min Gel, lb/100 ft² | 24 | 32 | 20 | 26 | 35 | 25 | 33 | 32 |
| Static Shear, lb/100 ft² | | | | | | | | |
| E.S. @150° F., V | | | 570 | | | 940 | | |
| HTHP Temp, ° F. | | | 325 | | | 325 | | |
| HTHP FL, ml | | | 8.8 | | | 17 | | |
| Water in HTHP Filtrate, ml | | | 0 | | | 0.2 | | |
| Sag value, ΔMW, ppg | | | | | | 2.13 | | |
| Free oil, mL | | | | | | 68 | | |

The rheology of the mud of Example 11 when 3.7 ppb Alcohol Ethoxylate 1 has been added is shown in Table 21 below.

TABLE 21

| | Heat Aging Temp., ° F. | | |
|---|---|---|---|
| | INITIAL | 325 | 325 |
| | | Heat Aging, hr | |
| | | 16 | 160 |
| | | Static/Rolling | |
| | | Dynamic | Static |
| | | Mud Weight, lb/gal | |
| | 13.97 | 13.97 | 13.97 |

| | | | | | | | | | |
|---|---|---|---|---|---|---|---|---|---|
| Rheology Temp, ° F. | 40 | 100 | 150 | 40 | 100 | 150 | 40 | 100 | 150 |
| R600, °VG | 235 | | 65 | 260 | 104 | 72 | 216 | 111 | 75 |
| R300, °VG | 127 | | 37 | 141 | 56 | 42 | 119 | 61 | 45 |
| R200, °VG | 87 | | 27 | 98 | 40 | 30 | 83 | 43 | 34 |
| R100, °VG | 47 | | 16 | 53 | 24 | 19 | 45 | 26 | 23 |
| R6, °VG | 6 | | 5 | 8 | 6 | 7 | 8 | 9 | 13 |
| R3, °VG | 4 | | 5 | 6 | 5 | 7 | 7 | 9 | 13 |
| PV, cP | 108 | 0 | 28 | 119 | 48 | 30 | 97 | 50 | 30 |
| YP, lb/100 ft² | 19 | 0 | 9 | 22 | 8 | 12 | 22 | 11 | 15 |
| LSYP, lb/100 ft² | 2 | 0 | 5 | 4 | 4 | 7 | 6 | 9 | 13 |
| 10-sec Gel, lb/100 ft² | 7 | | 12 | 8 | 8 | 13 | 10 | 21 | 27 |
| 10-min Gel, lb/100 ft² | 20 | | 37 | 19 | 29 | 41 | 28 | 36 | 34 |
| Static Shear, lb/100 ft² | | | | | | | | | |
| E.S. @150° F., V | | | | | | 670 | | | 1150 |
| HTHP Temp, ° F. | | | | | | 325 | | | 325 |
| HTHP FL, ml | | | | | | 8.8 | | | 17 |
| Water in HTHP Filtrate, ml | | | | | | 0 | | | 0.1 |
| Sag value, ΔMW, ppg | | | | | | | | | 2.13 |
| Free oil, mL | | | | | | | | | 62 |

Example 12

Evaluating Wetting Agent Addition After Hot Roll

In this example, a fluid is formulated as shown above in Table 17 and an insufficient amount of wetting agent is added prior to hot rolling the fluid at 325° F. for 16 hours. The wetting agent added was 0.9 ppb Alcohol Ethoxylate 1. After the hot rolling 3 more ppb of Alcohol Ethoxylate 1 was added to the hot rolled fluid and mixed for 5 minutes. The rheology of the two muds mentioned above and the mud with 3.9 ppb of Alcohol Ethoxylate 1 added after 12 hours of aging is shown in Table 22 Below

TABLE 22

| | Heat Aging Temp., ° F. | | |
|---|---|---|---|
| | 0.9 ppb Alcohol Ethoxylate 1 | 3.9 ppb Alcohol Ethoxylate 1 (After mixing for 5 minutes) | 3.9 ppb Alcohol Ethoxylate 1 (After aging for 12 hours and mixing for 5 minutes) |
| | Heat Aging, hr | | |
| | 16 | | 12 |
| | Static/Rolling | | |
| | Dynamic | | Dynamic |
| | Mud Weight, lb/gal | | |
| | 13.97 | 13.97 | 13.97 |

| | | | | | | | | | |
|---|---|---|---|---|---|---|---|---|---|
| Rheology Temp, ° F. | 40 | 100 | 150 | 40 | 100 | 150 | 40 | 100 | 150 |
| R600, °VG | 300+ | 105 | 66 | 215 | 89 | 59 | 212 | 87 | 60 |
| R300, °VG | 170 | 58 | 38 | 118 | 48 | 33 | 115 | 47 | 34 |
| R200, °VG | 122 | 41 | 29 | 83 | 33 | 24 | 80 | 33 | 24 |
| R100, °VG | 70 | 25 | 19 | 45 | 19 | 14 | 43 | 19 | 14 |
| R6, °VG | 18 | 7 | 7 | 7 | 4 | 5 | 6 | 4 | 4 |
| R3, °VG | 15 | 6 | 7 | 5 | 4 | 4 | 5 | 4 | 4 |
| PV, cP | ### | 47 | 28 | 97 | 41 | 26 | 97 | 40 | 26 |
| YP, lb/100 ft² | ### | 11 | 10 | 21 | 7 | 7 | 18 | 7 | 8 |

TABLE 22-continued

| | Heat Aging Temp., ° F. | | |
|---|---|---|---|
| | 0.9 ppb Alcohol Ethoxylate 1 | 3.9 ppb Alcohol Ethoxylate 1 (After mixing for 5 minutes) | 3.9 ppb Alcohol Ethoxylate 1 (After aging for 12 hours and mixing for 5 minutes) |
| Heat Aging, hr | 16 | | 12 |
| Static/Rolling | | | |
| | Dynamic | | Dynamic |
| Mud Weight, lb/gal | 13.97 | 13.97 | 13.97 |
| LSYP, lb/100 ft² | 12 5 7 | 3 4 3 | 4 4 4 |
| 10-sec Gel, lb/100 ft² | 24 10 12 | 8 5 7 | 6 5 7 |
| 10-min Gel, lb/100 ft² | 48 25 30 | 11 11 19 | 10 11 20 |

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method of drilling a wellbore, comprising:
   pumping an oleaginous wellbore fluid into a wellbore consisting of at least one of a high deviation well, a long reach well, and a horizontal well, the oleaginous wellbore fluid having a flat rheology profile and comprising:
   an oleaginous continuous phase;
   a non-oleaginous discontinuous phase;
   at least one amidoamine emulsifier stabilizing the non-oleaginous discontinuous phase in the oleaginous continuous phase;
   an organophilic clay comprising an organophilic sepiolite;
   a weighting agent;
   at least one wetting agent having a hydrophilic-lipophilic-balance (HLB) value ranging from about 4 to 9 that is selected such that the oleaginous wellbore fluid has a 600 rpm dial value at 40° F. of less than about 300 and a 10 minute gel strength value at 40° F. of less than about 40 lbf/100 ft²;
   wherein
   the at least one wetting agent is an alcohol ethoxylate depicted by Formula I:

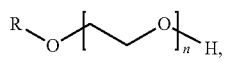

Formula I

R is an oleyl group, a stearyl group, a tridecyl group, or a lauryl group, and n is between 2 and 5,
the at least one amidoamine emulsifier is prepared from a reaction of at least one C10-C24 fatty acid and at least one ethyleneamine selected from the group consisting of ethylenediamine, diethylenetriamine, triethylenetetraamine, and tetraethylenepentaamine, and drilling the wellbore while circulating the oleaginous wellbore fluid in the wellbore; wherein the wellbore fluid comprises a sag factor of less than 0.54.

2. The method of claim 1, wherein the oleaginous wellbore fluid has a 10 minute gel strength value at 40° F. of less than 35 lbf/100 ft².

3. The method of claim 1, wherein the oleaginous wellbore fluid has a 6 rpm value at 150° F. of between about 6 and 15.

4. The method of claim 1, wherein the HLB value of the at least one wetting agent is between about 5 and 9.

5. The method of claim 1, wherein the at least one wetting agent is present in an amount ranging from about 2 to 6 pounds per barrel.

6. The method of claim 1, wherein the oleaginous wellbore fluid further comprises at least one component selected from calcium carbonate or halloysite in an amount between about 5 and 30 ppb.

* * * * *